United States Patent
Takemura et al.

(10) Patent No.: US 8,805,149 B2
(45) Date of Patent: Aug. 12, 2014

(54) OPTICAL WAVEGUIDE DEVICE

(71) Applicant: Sumitomo Osaka Cement Co., Ltd., Tokyo (JP)

(72) Inventors: Motohiro Takemura, Tokyo (JP); Tetsuya Fujino, Tokyo (JP); Takashi Shinriki, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 75 days.

(21) Appl. No.: 13/630,659

(22) Filed: Sep. 28, 2012

(65) Prior Publication Data
US 2013/0084038 A1 Apr. 4, 2013

(30) Foreign Application Priority Data
Sep. 30, 2011 (JP) .................. 2011-218558

(51) Int. Cl.
*G02B 6/10* (2006.01)
*G02B 6/122* (2006.01)
*G02F 1/01* (2006.01)
*G02F 1/035* (2006.01)

(52) U.S. Cl.
CPC *G02F 1/035* (2013.01); *G02B 6/10* (2013.01); *G02B 6/122* (2013.01); *G02F 1/011* (2013.01); *G02F 1/0134* (2013.01)
USPC .................. 385/131; 385/129; 385/130

(58) Field of Classification Search
CPC .......... G02B 6/10; G02B 6/122; G02F 1/011; G02F 1/0134; G02F 1/035
USPC .......................................... 385/131
See application file for complete search history.

(56) References Cited

U.S. PATENT DOCUMENTS 5,391,869 A * 2/1995 Ade et al. .................. 250/227.24
2011/0090484 A1 * 4/2011 Osterlund et al. .............. 356/51

FOREIGN PATENT DOCUMENTS

JP 2010-85789 A 4/2010

* cited by examiner

*Primary Examiner* — Ryan Lepisto
(74) *Attorney, Agent, or Firm* — Taft Stettinius & Hollister LLP

(57) ABSTRACT

An optical waveguide device that uses a thin substrate having an electro-optical effect and a thickness of 10 μm or less, in which slab propagation light that is reflected from an end face of the device is removed and thus deterioration in an operational characteristic is suppressed. The optical waveguide device includes: a thin substrate which has an electro-optical effect and thickness of 10 μm or less, and in which an optical waveguide is formed; and a supporting substrate that is adhered to the thin substrate through an adhesion layer. An antireflective film is formed on a part of a side surface of the optical waveguide device.

4 Claims, 2 Drawing Sheets

OPTICAL WAVEGUIDE DEVICE

TECHNICAL FIELD

The present disclosure contains subject matter related to that disclosed in, and priority is claimed to, Japanese Priority Patent Application JP 2011-218558 filed in the Japan Patent Office on Sep. 30, 2011, the entire contents of which are hereby incorporated by reference. The present invention relates to an optical waveguide device, and more particularly, to an optical waveguide device that is made of a thin substrate having an electro-optical effect and a thickness of 10 μm or less.

BACKGROUND ART

In a field of optical measurement or optical communication, optical waveguide devices such as an optical modulator that uses a substrate having an electro-optical effect are widely used. In addition, so as to realize a wider bandwidth of frequency response characteristics or so as to reduce a drive voltage, the substrate is made to have a small thickness of approximately 10 μm, whereby an effective refractive index of a microwave as a modulation signal is lowered, speed matching between the microwave and an optical wave is contrived, and improvement in electric field efficiency is contrived. As shown in PTL 1, this thin substrate is used after being adhered to another supporting substrate to have mechanical strength.

In a thin main substrate (also, referred to as a "thin substrate"), the behavior of signal light that propagates through the inside of the substrate becomes problematic. Particularly, stray light that leaks from an optical waveguide inside a thin substrate, for example, an S-shaped portion and a branching and coupling portion propagates through a thin substrate as a slab waveguide differently from a case in which the main substrate has thickness of 100 μm or more. In addition, when slab propagation light, which is reflected from an end face of the optical waveguide device, intersects the optical waveguide at a small angle, optical coupling occurs, and thus wavelength dependency of the optical waveguide device occurs in accordance with a coupling state. Furthermore, wavelength dependency occurs in propagation loss or a phase difference of a monitoring photo detector that monitors an extinction ratio, and thus an operational characteristic of the optical waveguide device deteriorates.

Specifications of the loss or extinction ratio are defined by the wavelengths bands that are used, and thus it is necessary to measure the characteristic in all of the wavelength bands that are used. As a result, the measurement takes a long time, and when the characteristic is inferior even in one wavelength, this has a significant effect on a yield rate.

CITATION LIST

Patent Literature

[PTL 1] Japanese Unexamined Patent Application Publication No. 2010-85789

SUMMARY OF INVENTION

Technical Problem

The invention is made to solve the above-described problems and an object thereof is to provide an optical waveguide device that uses a thin substrate having an electro-optical effect and thickness of 10 μm or less, in which slab propagation light that is reflected from an end face of the device is removed and thus deterioration in an operational characteristic is suppressed.

Solution to Problem

To solve the above-described problems, according to a first aspect of the invention, there is provided an optical waveguide device including: a thin substrate which has an electro-optical effect and a thickness of 10 μm or less, and in which an optical waveguide is formed; and a supporting substrate that is adhered to the thin substrate through an adhesion layer. An antireflective film is formed on a part of a side surface of the optical waveguide device.

According to a second aspect of the invention, in the optical waveguide device according to the first aspect, a surface on which the antireflective film is formed may be a surface at which an emission side end of the optical waveguide is disposed.

According to a third aspect of the invention, in the optical waveguide device according to the first aspect or the second aspect, the antireflective film may be formed over both of the thin substrate and the supporting substrate.

According to a fourth aspect of the invention, in the optical waveguide according to any one of the first aspect to the third aspect, the antireflective film may be designed with taking account of the refractive index of the adhesive.

Advantageous Effects of Invention

According to the first aspect of the invention, an optical waveguide device includes: a thin substrate which has an electro-optical effect and a thickness of 10 μm or less, and in which an optical waveguide is formed; and a supporting substrate that is adhered to the thin substrate through an adhesion layer, wherein an antireflective film is formed on a part of a side surface of the optical waveguide device. Therefore, it is possible to provide an optical waveguide device in which slab propagation light that is reflected from an end face of the device is removed and thus deterioration in an operational characteristic is suppressed.

According to the second aspect of the invention, the surface on which the antireflective film is formed is a surface at which an output end side of the optical waveguide is disposed. Therefore, slab propagation light that propagates in a direction in which the optical waveguide extends may be effectively removed, and thus an operational characteristic of the optical waveguide device may be further improved.

According to the third aspect of the invention, the antireflective film is formed over both of the thin substrate and the supporting substrate. Therefore, an adhesion area of the antireflective film increases, and thus peeling-off or chipping of the film may be suppressed.

According to the fourth aspect of the invention, the antireflective film is designed with taking account of the refractive index of the adhesive. Therefore, when an optical fiber is butt-jointed to the optical waveguide device with an adhesive, reflection between the optical waveguide and the adhesive is suppressed, thereby decreasing coupling loss.

DESCRIPTION OF EMBODIMENTS

Hereinafter, an optical waveguide device of the invention will be described with reference to an appropriate example.

Figure 1:
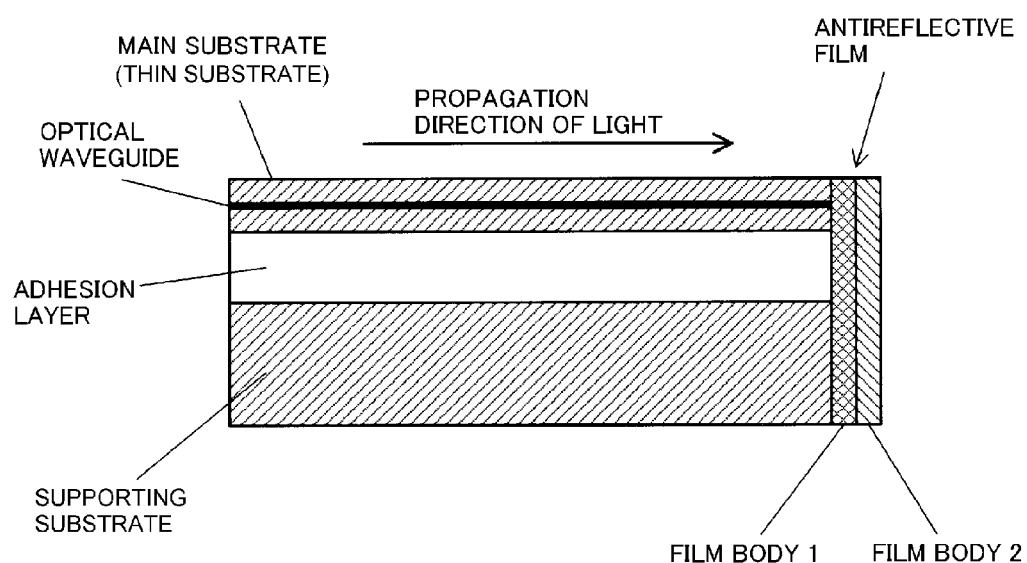
FIG. 1 is a cross-sectional view schematically illustrating an optical waveguide device of the invention.

As shown in FIG. 1, the optical waveguide device of the invention includes a thin substrate which has an electro-optical effect and a thickness of 10 μm or less, and in which an optical waveguide is formed, and a supporting substrate that is adhered to the thin substrate through an adhesion layer. An antireflective film is formed on a part of a side surface of the optical waveguide device.

As the substrate (thin substrate) having an electro-optical effect, particularly, any one of single crystals such as $LiNbO_3$, $LiTaO_5$, and PLZT (lead lanthanum zircornate titanate) may be appropriately used. Particularly, $LiNbO_3$ or $LiTaO_5$, which have been widely used in an optical modulator, is preferable. In addition, for example, an optical waveguide, which is formed in the substrate, is formed by thermally diffusing a material such as titanium (Ti) having a high refractive index on a $LiNbO_3$ substrate (LN substrate).

A modulation electrode that modulates an optical wave propagating through the optical waveguide may be provided to the optical waveguide device. The modulation electrode is configured by the signal electrode or the ground electrode, and may be formed by a method in which a Ti—Au electrode pattern is formed on a substrate surface and Au plating is performed, or the like. Furthermore, a buffer layer such as dielectric $SiO_2$ may be provided on a substrate surface after forming the optical waveguide, according to necessity.

As an adhesive that adhere the thin substrate and the supporting substrate to each other, an ultraviolet ray curable adhesive or the like may be used. However, the thickness of the adhesion layer is preferably 10 to 1,000 μm. When the thickness is smaller than 10 μm, it becomes difficult to accomplish speed matching between a microwave as a modulation signal and an optical wave that propagates through the optical waveguide. In addition, when the thickness of the adhesion layer is larger than 1,000 μm, an internal stress due to expansion and contraction of the adhesion layer itself increases and a supporting effect due to the supporting substrate becomes weak, and the thin substrate is easily broken.

As a material of the supporting substrate, the same material as the thin substrate is preferable from a viewpoint of matching a thermal expansion coefficient between the thin substrate and the supporting substrate. For example, in a case of using an LN substrate, the thickness is preferably 400 to 600 μm. When the thickness is too large, a size of the optical waveguide device increases, and thus thermal expansion of the supporting substrate or a pyroelectric effect also has an effect on the thin substrate. In addition, when the thickness is too small, it is difficult to expect much of a supporting effect.

With regards to the antireflective film, examples of a kind of film include $SiO_2$, $TiO_2$, $Ta_2O_5$, $Al_2O_3$, $Nb_2O_5$, $MgF_2$, and the like. In addition, the film thickness is preferably 0.05 to 3 μm.

The antireflective film may be formed using a dry method by vacuum film formation such as a sputtering method, a vapor deposition method, and a CVD method, or a wet method by spin coating.

Particularly, as shown in FIG. 1, the antireflective film ($SiO_2$, $TiO_2$, or the like) may be a single layer when considering productivity, but when considering the reflectivity, a multi-layer film in which reflectivity may be raised or lowered over a wide wavelength range is preferable. Therefore, it is preferable to have a laminated structure (a film body 1 and a film body 2) with at least two or more layers.

Figure 2:
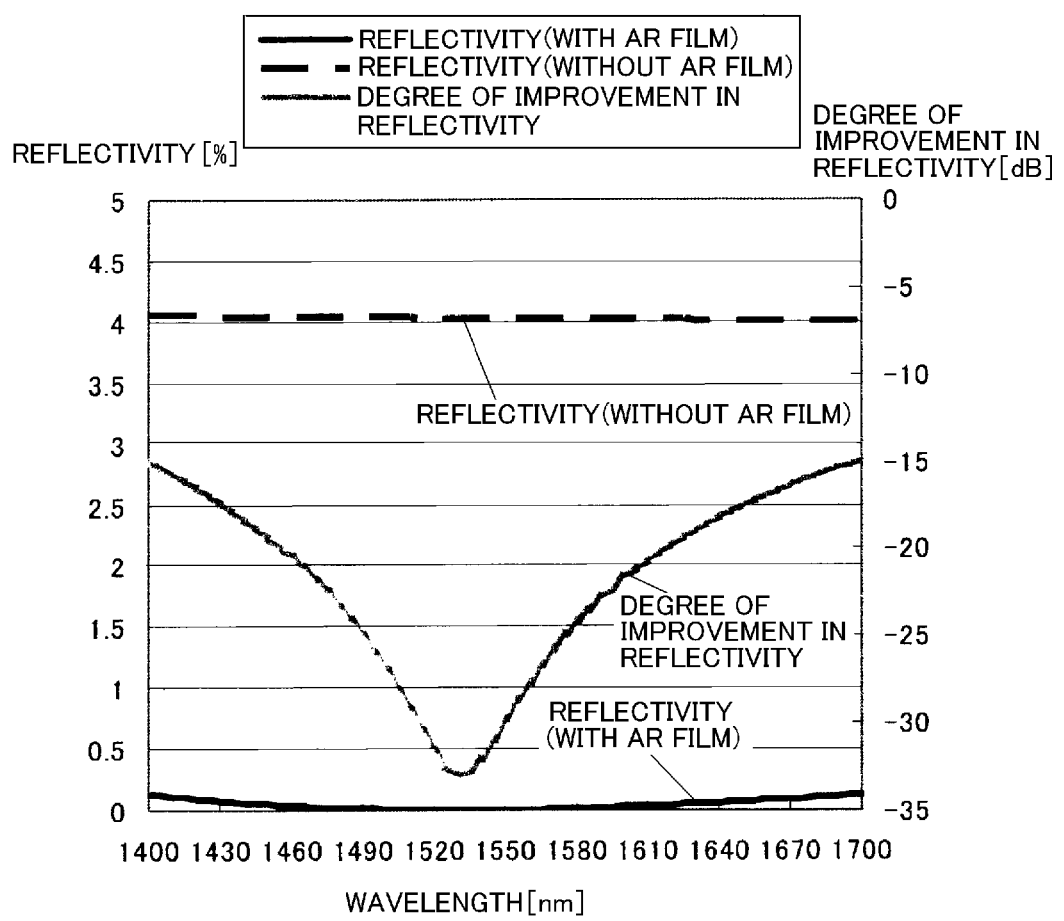
FIG. 2 is a graph illustrating a wavelength dependency of reflectivity in the optical waveguide device of the invention.

When the antireflective film (a laminated structure of $SiO_2$ (0.087 μm) and $Ta_2O_5$ (0.062 μm)) as shown in FIG. 1 is formed, as shown in a graph showing wavelength dependency of reflectivity in FIG. 2, reflection of slab propagation light (stray light) on an end face of the optical waveguide device is suppressed, and thus the stray light is prevented from being coupled to the optical waveguide. Therefore, a factor that causes a deterioration in optical characteristics such as an On/Off extinction ratio and a wavelength dependency may be excluded.

Furthermore, as an additional effect, loss may be reduced. For example, when an optical fiber is butt-jointed to the optical waveguide device, an adhesive is apt to be applied to the entire area of a cross-section in a width and thickness direction of end face of the waveguide device. Therefore, when the antireflective film is designed with taking account of the refractive index of the adhesive, reflection between the optical waveguide and the adhesive is suppressed, and thus approximately 4% of coupling loss is reduced.

Furthermore, as shown in FIG. 1, when a surface on which the antireflective film is formed is set as a surface at which an output end side of the optical waveguide is disposed, slab propagation light that propagates in a direction in which the optical waveguide extends may be effectively removed, and thus characteristics of the optical waveguide device may be further improved.

In addition, as shown in FIG. 1, the antireflective film is formed over both of the thin substrate and the supporting substrate, and thus an adhesion area of the antireflective film at a side surface of the optical waveguide device increases. Therefore, peeling-off or chipping of the film body may be suppressed.

INDUSTRIAL APPLICABILITY

As described above, according to the invention, it is possible to provide an optical waveguide device that is made of a thin substrate having an electro-optical effect and a thickness of 10 μm or less, in which slab propagation light that is reflected from an end face of the device is removed and thus deterioration in operational characteristic is suppressed.

The invention claimed is:

1. An optical waveguide device, comprising:
   a thin substrate which has an electro-optical effect and a thickness of 10 μm or less, and in which an optical waveguide is formed; and
   a supporting substrate that is adhered to the thin substrate through an adhesion layer,
   wherein an antireflective film is formed on a part of a side surface of the optical waveguide device, and
   wherein the antireflective film is formed over both of the thin substrate and the supporting substrate.

2. The optical waveguide device according to claim 1, wherein a surface on which the antireflective film is formed is a surface at which an output end side of the optical waveguide is disposed.

3. The optical waveguide device according to claim 2, wherein the antireflective film is designed with taking account of the refractive index of the adhesive.

4. The optical waveguide device according to claim 1, wherein the antireflective film is designed with taking account of the refractive index of the adhesive.

* * * * *